(12) United States Patent
Dupraz

(10) Patent No.: US 8,099,972 B2
(45) Date of Patent: Jan. 24, 2012

(54) DEVICE FOR HEATING, COOLING AND PRODUCING DOMESTIC HOT WATER USING A HEAT PUMP AND LOW-TEMPERATURE HEAT STORE

(75) Inventor: Michel Louis Dupraz, Morzine (FR)

(73) Assignee: Dupraz Energies, Annemasse (FR)

( * ) Notice: Subject to any disclaimer, the term of this patent is extended or adjusted under 35 U.S.C. 154(b) by 578 days.

(21) Appl. No.: 12/296,705

(22) PCT Filed: Apr. 10, 2007

(86) PCT No.: PCT/IB2007/000930
§ 371 (c)(1),
(2), (4) Date: Oct. 10, 2008

(87) PCT Pub. No.: WO2007/116299
PCT Pub. Date: Oct. 18, 2007

(65) Prior Publication Data
US 2009/0277203 A1    Nov. 12, 2009

(30) Foreign Application Priority Data
Apr. 11, 2006 (FR) .................................. 06 03473

(51) Int. Cl.
*F25D 23/12* (2006.01)
(52) U.S. Cl. ......................................... 62/260; 62/324.1
(58) Field of Classification Search .................... 62/260, 62/238.7, 324.1, 430; 165/10, 45, 61
See application file for complete search history.

(56) References Cited

U.S. PATENT DOCUMENTS

| | | | |
|---|---|---|---|
| 2,722,107 A | * | 11/1955 | Gay ................................. 62/157 |
| 4,111,259 A | | 9/1978 | Lebduska |
| 4,466,256 A | | 8/1984 | MacCracken |

FOREIGN PATENT DOCUMENTS

| | | |
|---|---|---|
| DE | 19929692 A1 | 4/2001 |
| EP | 0017975 A1 | 10/1980 |
| FR | 2505990 | 11/1982 |
| GB | 2247072 A | 2/1992 |

* cited by examiner

*Primary Examiner* — Melvin Jones
(74) *Attorney, Agent, or Firm* — William H. Eilberg

(57) ABSTRACT

A heating device includes a low-temperature heat store thermally coupled to a heat pump. The heat store is a buried pocket containing a permeable material and water. A high heat exchange capacity is thus achieved by exploiting both the high specific heat of the water and the high latent heat of liquefaction of the water contained in the heat store.

14 Claims, 3 Drawing Sheets

DEVICE FOR HEATING, COOLING AND PRODUCING DOMESTIC HOT WATER USING A HEAT PUMP AND LOW-TEMPERATURE HEAT STORE

TECHNICAL FIELD OF THE INVENTION

The present invention concerns heating systems, air conditioning systems and domestic hot water production devices for individual or collective space.

The invention concerns more particularly heating devices with a heat pump and heat collector using a cold source and a hot source.

Installations with a heat pump and buried heat exchanger for heating and producing domestic hot water for individual or collective space are known already. For example, the document FR 2 505 990 A1 describes one such installation with a solar collector and buried heat exchanger connected in series with a heat pump. In the above document, the buried heat exchanger, referred to as a geothermal energy collector, is a long buried pipe in which water flows. The pipe is therefore in direct contact with the soil in which it is buried.

Such installations are not entirely satisfactory:
1. they suffer from high consumption when the direct temperature (air or sun) is higher than that of the soil;
2. they necessitate the installation of large and costly heat exchangers:
   approximately 1 m depth per $m^2$ heated for a vertical heat exchanger, which entails deep and costly drilling,
   approximately 2 $m^2$ of area per $m^2$ heated for a horizontal heat exchanger, which occupies an area that is often too large.

Failure to comply with good practice in respect of dimensions leads to thermal impoverishment of the soil with the risk of freezing, distortion or breakdown. The efficiency of such installations is greatly dependent on the nature of the soil. In particular, in dry soil, the buried heat exchanger has a very low thermal capacity and its thermal coupling with the surrounding soil is poor. When used as a cold source, its temperature falls quickly if the atmospheric temperature falls and necessitates the extraction of heat energy from the cold source. The heat pump then functions between hot and cold sources the difference in temperature between which increases, which degrades its efficiency.

Outdoor air evaporator heat pumps equipped with a fan are also known.

Such installations are not entirely satisfactory because they need an antifreeze device for the outdoor heat exchanger and suffer from decreasing thermal and energy performance as the temperature of the outside air falls, thus necessitating another heating device for cold periods.

Heating installations that also produce domestic hot water using solar collectors are also known, for example as described in the document U.S. Pat. No. 4,111,259. This document teaches use of a thermal storage tank in the form of a tank containing water to store heat energy from solar collectors during the day and return it during the night.

Such installations are not entirely satisfactory, on the one hand because the areas of the solar collectors must be very large, making them very costly, and on the other hand they necessitate another heating device for cold periods without sunshine.

SUMMARY OF THE INVENTION

The problem addressed by the present invention is that of designing a heating and/or air-conditioning device based on a heat pump that is both efficient under all climatic conditions and of low cost and low overall size in terms of installing the buried heat exchangers.

The invention aims in particular to increase substantially the efficiency of the buried heat exchangers, so as to confer on them high thermal efficiency for a volume that remains reasonable.

The invention aims to design a device of this kind in which, under normal conditions of use, the buried heat exchanger remains at all times at a sufficiently high temperature not to degrade excessively the efficiency of the heat pump.

To achieve the above and other objects, the invention proposes a heating and/or air conditioning device for a home or other space, including a heat pump thermally coupled to a buried heat exchanger, and in which the heat exchanger is contained in a buried thermal storage tank and the thermal storage tank includes an underground pocket containing a permeable material and water.

As a result, the heat exchanger is at all times in close thermal contact with the content of the pocket, the water present in the pocket at all times providing this good thermal contact. The pocket itself constitutes a large mass having high thermal inertia, and so the exchanger can constitute a high-capacity cold source for the heat pump.

The pocket constitutes an element ensuring the maintained presence of water, even in the case of use in dry soil.

The presence of water gives the thermal storage tank a high thermal capacity at all times, because of the high specific heat of water. Furthermore, when the device is operating in cold periods, the thermal storage tank can be used at temperatures equal to or less than 0° C., benefiting from the latent heat of liquefaction of water, which gives the thermal storage tank, at around 0° C., an even higher thermal capacity. In other words, the heat exchanger can function as a cold source at 0° C. for a long time, without its temperature falling below 0° C., and therefore without significantly degrading the efficiency of the heat pump.

The permeable material in the pocket can advantageously be a natural material such as sand, earth, gravel or mixtures thereof. These materials are easily available on site, and so the thermal storage tank is produced at low cost.

The pocket is preferably covered with earth, to isolate it from the surrounding atmosphere. A depth of earth of at least 1 m may be appropriate. Isolated in this way, the operation of the thermal storage tank becomes independent of climatic variations and benefits from the mean soil temperature.

The pocket can comprise an envelope that is impermeable to water, for example a plasticized envelope.

The pocket can advantageously be open at the top, in the form of a buried cup retaining the permeable material and the water around the heat exchanger. In practice this produces a kind of marsh, in which rainwater ensures that a satisfactory average quantity of water is maintained.

Alternatively, also open at the top, the pocket can take the form of an elongate trench in the soil.

In both cases, being open at the top allows variations in the volume of the content of the pocket on freezing or thawing in operation at around 0° C.

However, during freezing and thawing, the material situated above the envelope is subject to variations in volume that tend to deform the soil above the envelope. Thus swelling can occur, followed by collapse, which compact the permeable material and the earth that covers it. The surface of the soil is deformed, and this can be a problem. This phenomenon is reduced by using a thermal storage tank in the form of a trench. In a trench, the vertical trench walls, relatively close together, retard vertical displacements of the material and thus reduce the effects of compaction.

The device of the invention can provide efficient space heating. A unidirectional heat pump is used for this. However, the device of the invention can also provide efficient air conditioning, i.e. cooling of the space. A reversible heat pump is used for this, the cold source then being the space itself.

The thermal coupling between the heat pump and the thermal storage tank can preferably be provided by a collection circuit with a collection circulator pump and using a collection heat exchange fluid.

The collection heat exchange fluid can be water containing glycol, for example. This avoids the risks of a polluting liquid spreading into the soil in the event of rupture of the collection circuit.

The collection circuit can advantageously further include an outdoor heat exchange structure through which the collection heat exchange fluid flows, with a valve for controlling the flowrate of the collection heat exchange fluid in the outdoor heat exchange structure.

For example, the outdoor heat exchange structure can include an atmospheric air/heat exchange fluid heat exchanger and/or a solar collector. This improves the efficiency of such outdoor heat exchanger structure in some climatic conditions.

One advantageous embodiment of the device further includes:
- means for exchange of heat with the indoor atmosphere of the space to be heated and/or means for exchange of heat with a domestic hot water circuit,
- a heating circuit using an intermediate heat exchange fluid and an intermediate circulator pump,
- means for controlling the flowrate of the intermediate heat exchange fluid to provide selective thermal coupling of the heat exchange means via the intermediate heat exchange fluid either with the heat pump or with other collectors such as solar collectors or atmosphere heat exchangers.

With a device of this kind including intermediate heat exchange fluid flowrate control means, means can advantageously also be provided for controlling the collection thermal coupling to control the thermal coupling between the heat pump and the buried heat exchanger and processor-based stored program control means for driving said collection thermal coupling control means.

The program can advantageously include a sequence of heating by the heat pump from the thermal storage tank, sequence during which the water contained in the thermal storage tank is cooled and can go from its liquid state to its solid state.

Instead of or in addition to this, the program can advantageously include a sequence for the regeneration of the thermal storage tank, sequence during which the water contained in the thermal storage tank is heated by an atmosphere collector or a solar collector.

In conjunction with solar collectors, a device of the invention with a thermal storage tank ensures to produce domestic hot water either directly and free on days with sufficient sunshine or economically via the heat pump from the thermal storage tank.

Solar collectors can be used in two ways in the device of the invention:
- in periods of sufficient sunshine, they produce domestic hot water and simultaneously regenerate the thermal storage tank,
- in periods with insufficient sunshine, they still feed the cold source of the heat pump.

The invention achieves great savings and, compared to traditional heating systems consuming electrical power or fossil fuels, achieves a coefficient of performance better than 4 over the whole of the period of use of heating in an "alpine" climatic area, at the same time occupying a small area of land.

BRIEF DESCRIPTION OF THE DRAWINGS

Other objects, features and advantages of the present invention will emerge from the following description of particular embodiments, given with reference to the appended figures, in which.

DESCRIPTION OF PREFERRED EMBODIMENTS

Figure 1:
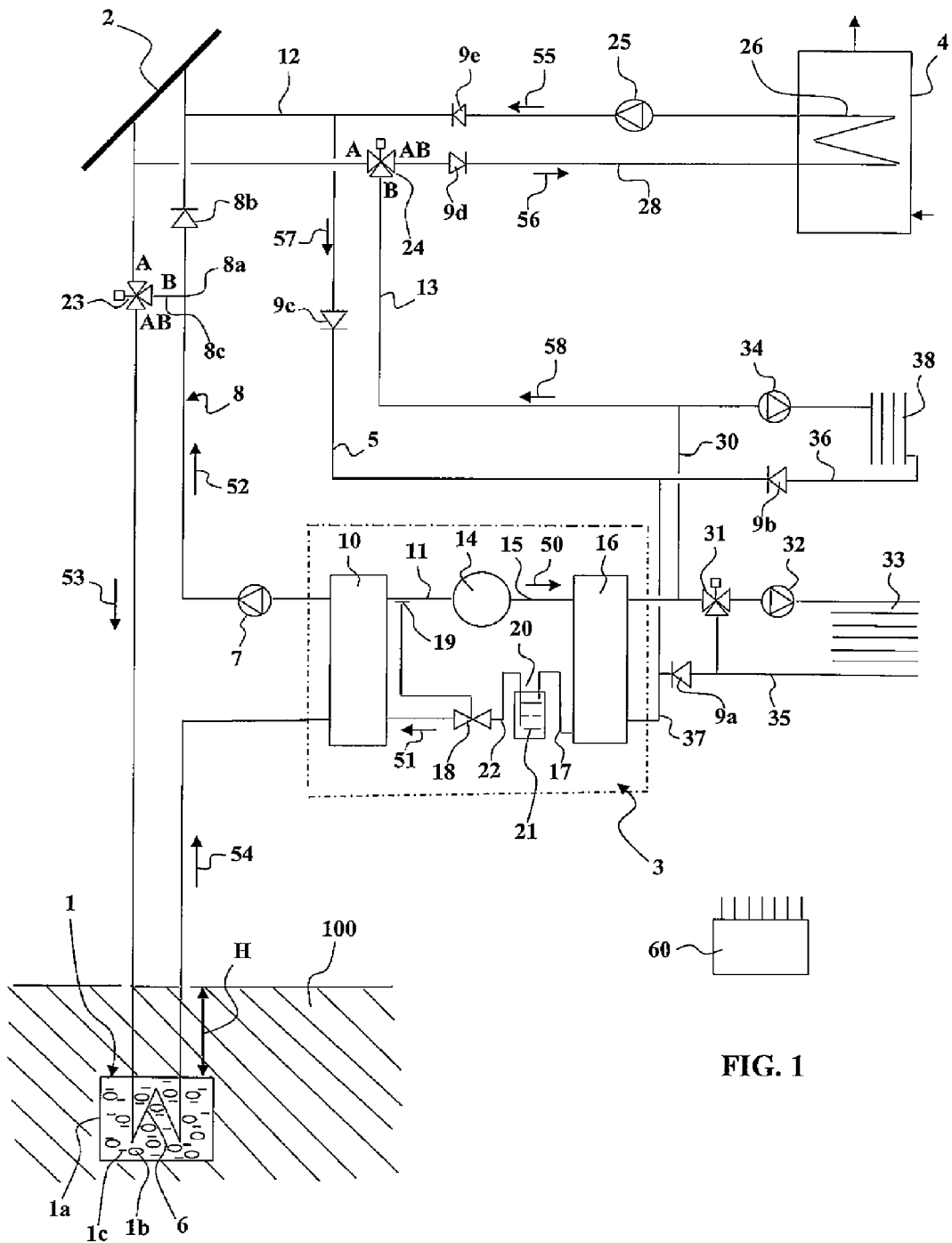
FIG. 1 is a diagram of a heating installation that also produces domestic hot water of one embodiment of the device of the present invention.

In the FIG. 1 embodiment, the heating and/or air conditioning device of the invention generally includes a thermal storage tank 1, a solar collector 2, a heat pump 3, means for providing thermal coupling between the heat pump 3, the thermal storage tank 1 and the solar collector 2, and means for providing thermal coupling between the heat pump 3 and the elements to be heated such as the atmosphere of the space or the domestic hot water.

The thermal storage tank 1 includes a pocket 1a buried in the soil 100, covered by a depth H of soil. The depth H is advantageously greater than or equal to approximately 1 m. Examples of thermal storage tank structures are described later. In all cases, the pocket 1a contains a permeable material 1b and water 1c.

In the embodiment shown, the thermal coupling between the heat pump 3 and the thermal storage tank 1 is provided by a collection circuit comprising a collection circulator pump 7 and a collection pipe 8 containing a collection heat exchange fluid such as water containing glycol or some other liquid that does not freeze under the conditions of use. From the heat pump 3, the collection circulator pump 7 pumps the collection heat exchange fluid through the collection pipe 8 to the solar collector 2, then to the thermal storage tank 1, then to the heat pump 3 again. In the thermal storage tank 1, the collection heat exchange fluid passes through a heat exchanger 6 providing exchange of heat between the collection heat exchange fluid and the materials contained in the pocket 1a. Between the circulator pump 7 and the solar collector 2, the collection pipe 8 includes a branch connection 8a between a pipe section with a check valve 8b that leads to the solar collector 2 and a branch section 8c that leads to a diverter valve 23 inserted into the collection pipe 8 between the solar collector 2 and the thermal storage tank 1.

The heat pump 3 includes the four essential elements of a standard heat pump, namely an evaporator 10, a condenser 16, a compressor 14 and a pressure-reducing valve 18.

The compressor 14 pumps a refrigerant fluid through a pipe 15 into the water-type condenser 16. The condensed refrigerant fluid is then directed to a tank 20 through a pipe 17. A pipe 22 takes refrigerant fluid 21 from the tank 20 and feeds it to a thermostatic pressure-reducing valve 18 with a temperature sensor 19 disposed on an inlet pipe 11 of the compressor 14. The expanded liquid leaving the pressure-reducing valve 18 is directed to the evaporator 10. The collection heat exchange fluid from the thermal storage tank 1 and passing through the evaporator 10 causes the refrigerant fluid to be evaporated and overheated in the evaporator 10, and this fluid exits via the inlet pipe 11 to the compressor 14.

In the condenser 16, the refrigerant fluid gives up heat energy to the load, i.e. to the space to be heated or to the domestic hot water to be heated.

Considering again the collection circuit consisting of the collection pipe 8 and the various components to which it is connected, it is clear that the collection circuit includes an outdoor heat exchange structure through which the collection heat exchange fluid flows, the outdoor heat exchange structure including the solar collector 2. Instead of or in addition to this, the solar collector 2 can be replaced by or have added to it an atmospheric air/heat exchange fluid heat exchanger, for example of known structure.

The diverter valve 23 constitutes a valve for controlling the flowrate of the collection heat exchange fluid in the outdoor heat exchange structure.

To transmit heat energy from the condenser 16 to the load, the device further includes means for heat exchange with the atmosphere inside the space or the home or with a domestic hot water circuit.

In the embodiment shown in FIG. 1, the heat exchange means include a heat distribution network in which water flows. There can be seen circulator pumps 32 and 34 which feed, via respective pipes 35 and 36 and a mixer 31, an underfloor heating system 33 and radiators 38, which are shown by way of example.

In parallel with this, the condenser 16 can also feed a domestic hot water heat exchanger 26 via a circulator pump 25, the flow of water being controlled by a diverter valve 24. Check valves 9a, 9b, 9c, 9d and 9e are provided in the pipes, as shown in FIG. 1, to allow fluid to flow in only one direction and to enable the various steps of operation of the heat energy transmission circuits.

The device of this kind shown in FIG. 1 can, as required, and simultaneously or not, provide heating and produce domestic hot water, either directly from the solar collector 2 or indirectly from the thermal storage tank 1 via the heat pump 3. The diverter valves 23 and 24, the circulator pumps 7, 32, 34 and 25, and the compressor 14 control and monitor the flow of the fluids as a function of the operating steps.

During a "heating" sequence, the diverter valve 23 is open in the A to AB direction and the collection heat exchange fluid flows as indicated by the arrows 52, 53 and 54.

During a "direct domestic hot water" sequence, the diverter valve 23 is open in the B to AB direction. The diverter valve 24 is open in the A to AB direction. The circulator pump 25 discharges via the pipe 12 into the solar collector 2 and then into the heat exchanger 26 of the water heater 4 via the pipe 28, as indicated by the arrows 55 and 56.

During an "indirect hot water" sequence, the diverter valve 24 is open in the B to AB direction. The circulator pump 25 discharges via the pipes 5 and 37 into the condenser 16 and then into the heat exchanger 26 of the water heater 4 via the pipes 30, 13 and 28, as indicated by the arrows 55, 56, 57 and 58.

The elements such as the circulator pumps 7, 32, 34 and 25 and the diverter valves 23 and 24 constitute fluid flowrate control means for controlling the flowrate of the heat exchange fluids in order to vary the thermal coupling between the heat pump 3 and, on the one hand, the collectors such as the solar collector 2 and the thermal storage tank 1, and, on the other hand, the heat exchanger means such as the underfloor heating system 33, the radiator 38 and the heat exchanger 26. In other words, these elements constitute means for controlling the thermal coupling between the heat pump 3 and its environment.

The coupling control means, which control the thermal coupling between the heat pump 3 and its environment, are preferably driven by actuators and controlled by processor-based stored program control means 60. Control lines, not shown in the figure, connect the control means 60 to the actuators of the circulator pumps 7, 32, 34, 25 and the diverter valves 23, 24.

The program includes a sequence of heating by the heat pump 3 from the thermal storage tank 1. The thermal storage tank 1 is normally at a low temperature, i.e. a temperature lower than that of the space to be heated. During this heating sequence, the circulator pump 7 causes the collection heat exchange fluid to flow in the collection pipe 8 and in the heat exchanger 6, and the heat pump 3 operates using the thermal storage tank 1 as a cold source. The water 1c and the other materials 1b contained in the thermal storage tank 1 are then cooled and the heat energy taken from the thermal storage tank 1 is transferred into the load areas of the space via the underfloor heating system 33, the radiators 38 and the heat exchanger 26. Under cold climatic conditions, the water 1c contained in the thermal storage tank 1 can go from its liquid state to its solid state without interfering with the operation of the device. To the contrary, the device then benefits from the latent heat of liquefaction of water, which gives the thermal storage tank 1 a high calorific capacity without its temperature falling.

The program also includes a regeneration sequence for the thermal storage tank 1. During this sequence, the circulator pump 7 causes the collection heat exchange fluid to flow at the same time in the solar collector 2 and in the heat exchanger 6. The water contained in the thermal storage tank 1 is then heated by the solar collector 2 (or by the atmosphere collector).

Figure 2:
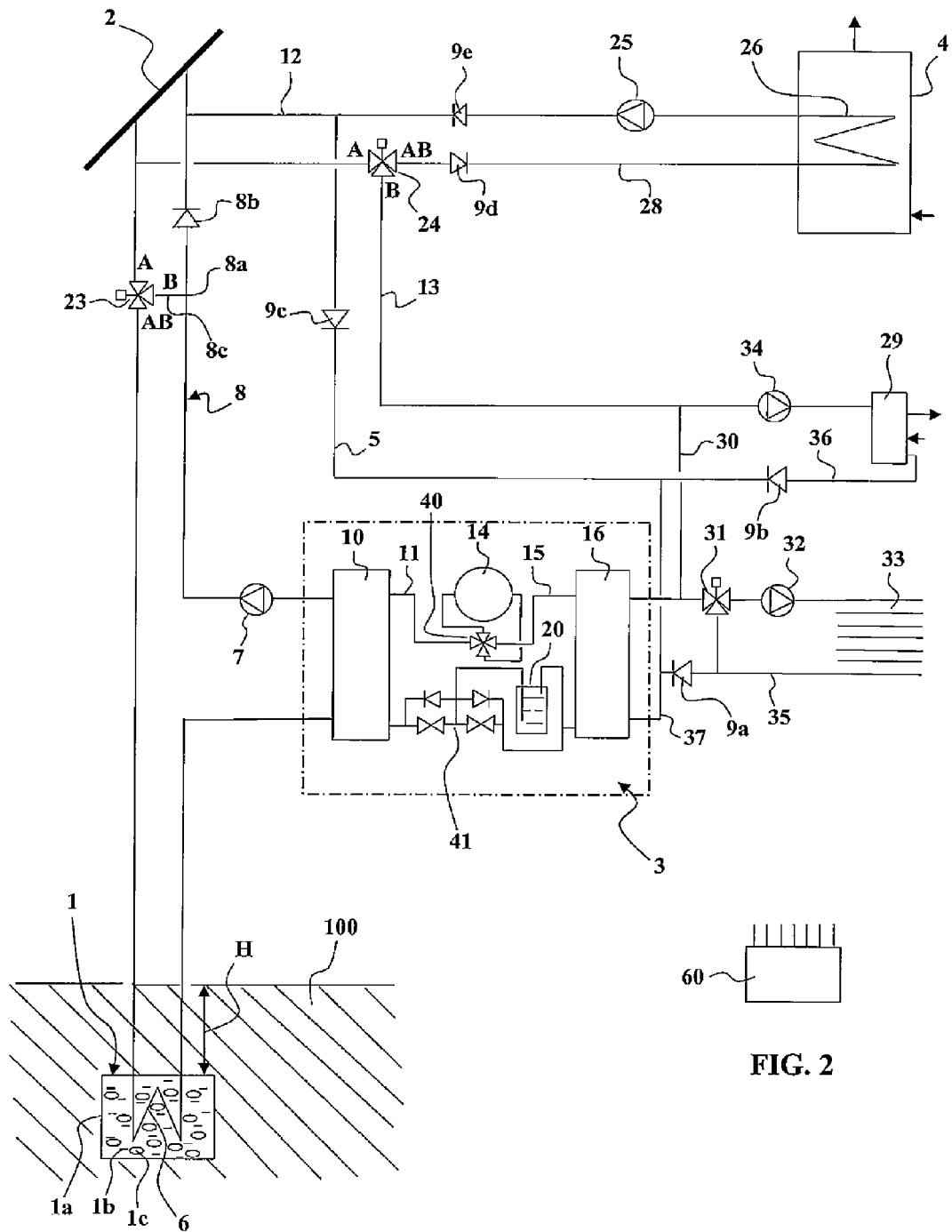
FIG. 2 shows the general structure of a heating and cooling installation that also produces domestic hot water of a second embodiment of the device of the present invention.

Consider now FIG. 2, which shows a reversible variant of the FIG. 1 device. It includes the same means, identified by the same reference numbers. The difference compared to the FIG. 1 device lies essentially in means producing a reversible heat pump 3, thanks to a reverse valve 40 and a structure 41 providing a bidirectional pressure-reducing valve. The FIG. 1 radiators 38 are replaced by air conditioning units 29.

In the FIG. 2 embodiment, the heat pump 3 can operate in the manner described with reference to FIG. 1, using the thermal storage tank 1 as a cold source.

To operate as an air conditioning system, the heat pump 3 is reversed, the evaporator 10 becomes the condenser, and the condenser 16 becomes the evaporator. The heat pump 3 then uses the air conditioning units 29 as a cold source and takes from the atmosphere in the space heat energy that it then injects into the thermal storage tank 1.

During the heating sequence, the processor-based stored program control means 60 cause the compressor 14 to operate in the direction causing the refrigerant fluid to flow in the direction shown by the arrows 50 and 51 in FIG. 1, between the evaporator 10 and the condenser 16. The collection circulator pump 7 causes the collection heat exchange fluid to flow between the evaporator 10 and the heat exchanger 6. In the absence of solar radiation (or in the case of an outdoor temperature lower than that of the thermal storage tank 1), the diverter valve 23 bypasses the solar collector 2 (or the atmosphere collector), the collection heat exchange fluid passing through the branch connection 8c. In the presence of solar radiation (or in the case of an outdoor temperature higher than that of the thermal storage tank 1), the control means 60 can drive the diverter valve 23 to close off the branch connection 8c and to cause the collection heat exchange fluid to flow through the solar collector 2 (or the atmosphere heat exchanger).

During a sequence of regeneration of the thermal storage tank 1, the heat pump 3 can be stopped, the collection circulator pump 7 continuing to operate to force the collection heat exchange fluid to flow. The diverter valve 23 shuts off the branch connection 8c, so that solar radiation impinging on the solar collector 2 heats the collection heat exchange fluid and the heat energy received by the solar collector 2 heats the thermal storage tank 1.

Figure 3:
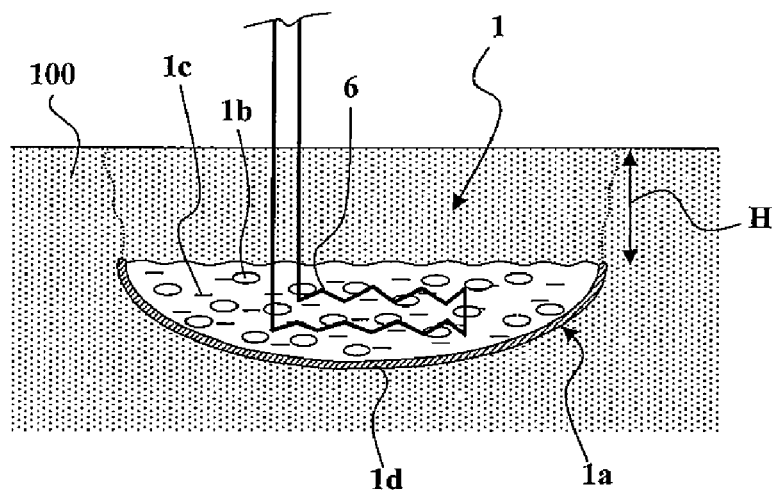
FIG. 3 is a sectional diagram of a thermal storage tank structure of a first embodiment of the invention.
Figure 4:
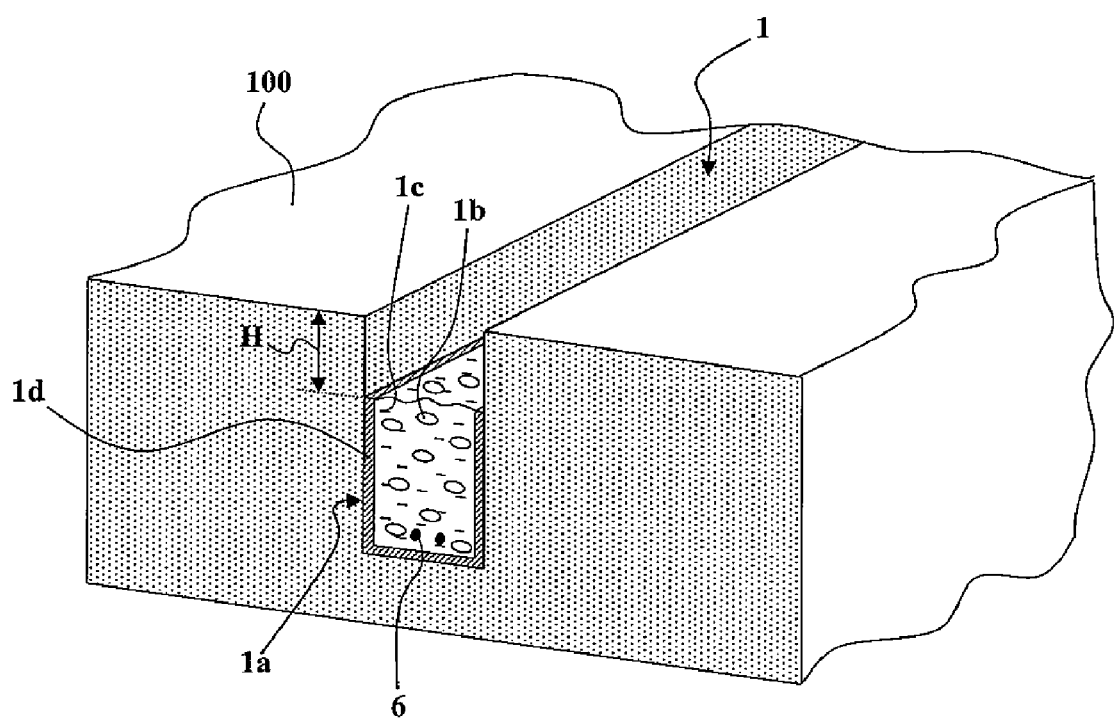
FIG. 4 is a sectional diagram of a thermal storage tank of a second embodiment of the present invention.

Consider now FIGS. 3 and 4, which show two embodiments of the thermal storage tank 1.

In both cases, the thermal storage tank 1 is buried in the soil 100, covered to a depth H with earth.

In both cases, the thermal storage tank 1 includes an underground pocket 1a containing a permeable material 1b and water 1c. The permeable material 1b is a natural material such as sand, earth, gravel or mixtures thereof.

Again in both cases, the pocket 1a comprises an envelope 1d that is impermeable to water. The envelope 1d can be a plasticized envelope, an envelope in a reinforced plastic material such as fiber-reinforced polyethylene.

The pocket 1a is open at the top as shown in FIGS. 3 and 4.

In FIG. 3, the pocket 1a takes the form of a buried cup, with raised edges to retain the permeable material 1b and the water 1c, around the heat exchanger 6.

In FIG. 4, the pocket 1a, also open at the top, is in the form of an elongate trench in the soil.

Clearly, producing this kind of thermal storage tank is relatively inexpensive, as essentially a material available on site is used.

At the same time, this kind of thermal storage tank 1 contains a relatively large volume of water, which gives the benefit not only of the high specific heat of water, but also of the latent heat of liquefaction of water to give the thermal storage tank 1 a high thermal capacity for low temperature variations, guaranteeing that a satisfactory efficiency of the heat pump is maintained. At the same time, the footprint of this kind of thermal storage tank 1 can be much smaller than that of horizontal heat exchangers of the same capacity.

The installation of the invention provides, as required, simultaneously or not, heating and direct or indirect production of domestic hot water. The system is controlled automatically, the control system acting on the diverter valves, circulator pumps and compressor.

The invention is not limited to heat pumps and solar collectors associated with thermal storage tanks. It also finds an application in systems with a heat pump and solar collectors associated with collectors buried at a shallow depth (0.6 to 1.5 m), with vertically drilled collectors at any depth, and with static or fan-equipped atmosphere collectors using circulation of water.

The principal application of the invention is to heating, cooling and production of domestic hot water in homes.

The present invention is not limited to the embodiments explicitly described, and encompasses variants and generalizations thereof within the scope of the following claims.

The invention claimed is:

1. Heating and/or air conditioning device for a home or other space, including a heat pump (3) thermally coupled to a buried heat exchanger (6), wherein:
   the heat exchanger (6) is contained in a buried thermal storage tank (1),
   the thermal storage tank (1) includes an underground pocket (1a) containing a permeable material (1b) and water (1c),
   further including:
   means (33, 38) for exchange of heat with the indoor atmosphere of the space to be heated and/or means (26) for exchange of heat with a domestic hot water circuit,
   a heating circuit (35, 36, 28) using an intermediate heat exchange fluid and an intermediate circulator pump (32, 34, 25),
   means (31, 24) for controlling the flowrate of the intermediate heat exchange fluid to provide selective thermal coupling of the heat exchange means (33, 38, 26) via the intermediate heat exchange fluid either with the heat pump (3) or with other collectors such as solar collectors (2) or atmosphere heat exchangers.

2. Device according to claim 1, including collection thermal coupling control means (23, 7) for controlling the thermal coupling between the heat pump (3) and the buried heat exchanger (6) and processor-based stored program control means (60) for driving said collection heat exchange coupling control means (7, 23).

3. Device according to claim 2, wherein the program includes a sequence of heating by the heat pump (3) from the thermal storage tank (1) during which the water (1c) contained in the thermal storage tank (1) is cooled and can go from its liquid state to its solid state.

4. Device according to claim 2, wherein the program includes a sequence of regeneration of the thermal storage tank (1) during which the water (1c) contained in the thermal storage tank (1) is overheated by an atmosphere collector or a solar collector (2).

5. Heating and/or air conditioning device for a home or other space, including a heat pump (3) thermally coupled to a buried heat exchanger (6), wherein:
   the heat exchanger (6) is contained in a buried thermal storage tank (1),
   the thermal storage tank (1) includes an underground pocket (1a) containing a permeable material (1b) and water (1c),
   wherein the pocket (1a) includes an envelope (1d) that is impermeable to water, and
   wherein the envelope (1d) of the pocket (1a) is plasticized.

6. Heating and/or air conditioning device for a home or other space, including a heat pump (3) thermally coupled to a buried heat exchanger (6), wherein:
   the heat exchanger (6) is contained in a buried thermal storage tank (1),
   the thermal storage tank (1) includes an underground pocket (1a) containing a permeable material (1b) and water (1c),
   wherein the pocket (1a) includes an envelope (1d) that is impermeable to water, and
   wherein the pocket (1a) is open at the top, in the form of a buried cup retaining the permeable material (1b) and the water (1c) around the heat exchanger (6).

7. Device according to claim 6, wherein the permeable material (1b) is a natural material such as sand, earth, gravel or mixtures thereof.

8. Device according to claim 6, wherein the pocket (1a) is covered with earth.

9. Device according to claim 8, wherein the pocket (1a) is covered with earth to a depth (H) of at least 1 m.

10. Device according to claim 6, wherein the thermal coupling between the heat pump (3) and the thermal storage tank (1) is provided by a collection circuit with a collection circulator pump (7) using a collection heat exchange fluid.

11. Device according to claim 10, wherein the collection circuit further includes an outdoor heat exchange structure (2) through which the collection heat exchange fluid flows, with a valve (23) for controlling the flowrate of the collection heat exchange fluid in the outdoor heat exchange structure (2).

12. Device according to claim 11, wherein the outdoor heat exchange structure includes an atmospheric air/heat exchange fluid heat exchanger and/or a solar collector (2).

13. Heating and/or air conditioning device for a home or other space, including a heat pump (3) thermally coupled to a buried heat exchanger (6), wherein:

the heat exchanger (6) is contained in a buried thermal storage tank (1), the thermal storage tank (1) includes an underground pocket (1a) containing a permeable material (1b) and water (1c), wherein the pocket (1a) includes an envelope (1d) that is impermeable to water, and wherein the pocket (1a) is open at the top, in the form of an elongate trench in the soil (100).

14. Device according to claim 13, wherein the heat pump (3) is reversible.

* * * * *